(12) United States Patent
Hanamoto

(10) Patent No.: US 7,413,092 B2
(45) Date of Patent: Aug. 19, 2008

(54) CONSTRUCTION MACHINE

(75) Inventor: Takahiro Hanamoto, Akashi (JP)

(73) Assignee: Kobelco Cranes Co., Ltd., Tokyo (JP)

( * ) Notice: Subject to any disclaimer, the term of this patent is extended or adjusted under 35 U.S.C. 154(b) by 339 days.

(21) Appl. No.: 11/276,604

(22) Filed: Mar. 7, 2006

(65) Prior Publication Data

US 2006/0216184 A1 Sep. 28, 2006

(30) Foreign Application Priority Data

Mar. 8, 2005 (JP) ............................. 2005-064472

(51) Int. Cl.
*B66C 23/84* (2006.01)

(52) U.S. Cl. .................. 212/181; 212/253; 384/591; 384/593

(58) Field of Classification Search ................. 212/180, 212/181, 253; 384/591–593
See application file for complete search history.

(56) References Cited

U.S. PATENT DOCUMENTS

| 3,921,817 | A |   | 11/1975 | Petrik et al. |         |
|-----------|---|---|---------|---------------|---------|
| 4,466,551 | A | * | 8/1984  | Leung         | 220/293 |
| 5,522,515 | A | * | 6/1996  | Pech et al.   | 212/175 |
| 5,664,692 | A | * | 9/1997  | Sauter et al. | 212/181 |

FOREIGN PATENT DOCUMENTS

| DE | 32 44 153 A1 |   | 5/1984  |
|----|--------------|---|---------|
| DE | 37 23 961 A1 |   | 2/1989  |
| JP | 62-23891     |   | 6/1987  |
| JP | 8-259178     |   | 10/1996 |
| SU | 653355       | * | 3/1979  |

* cited by examiner

*Primary Examiner*—Peter M. Cuomo
*Assistant Examiner*—Eric E. Pico
(74) *Attorney, Agent, or Firm*—Oblon, Spivak, McClelland, Maier & Neustadt, P.C.

(57) ABSTRACT

A construction machine includes a vertical separating/connecting device interposed between a lower traveling body and a swing bearing that supports an upper rotating body. The device includes an externally toothed ring member fixed to the swing bearing with a first attaching unit, a rotating unit that rotates the externally toothed ring member, an internally toothed ring member fixed to the lower traveling body with a second attaching unit positioned on an attachment pitch circle having the same diameter and center as an attachment pitch circle of the first attaching unit, and a fixing unit that fixes the externally toothed ring member or the internally toothed ring member. Internal teeth of the internally toothed ring member and external teeth of the externally toothed ring member are positioned so as to allow the movement of the external teeth or to engage with each other when the externally toothed ring member is rotated.

8 Claims, 5 Drawing Sheets

CONSTRUCTION MACHINE

BACKGROUND OF THE INVENTION

1. Field of the Invention

The present invention relates to a construction machine having a vertical separating/connecting device for separating a lower traveling body and an upper rotating body from each other and connecting the lower traveling body and the upper rotating body to each other.

2. Description of the Related Art

When a large mobile crane runs on a public road, the mobile crane must be disassembled into a lower traveling body and an upper rotating body at a swing bearing in order to comply with the weight limit as an automobile. However, since the weight limits of automobiles differ depending on the regulations of each country, the necessity of separating cranes differs depending on the country in which they are used even when the cranes are of the same model. This also applies to the case in which crawler cranes are transported by trailers. Accordingly, the following problems occur when cranes with the same specification are exported to different countries over the world.

That is, if a crane is provided with a vertical separating/connecting device even though it is not necessary to separate the crane into a lower traveling body and an upper rotating body when the crane runs or is transported on a public road, the cost is increased by the amount corresponding to the cost of the vertical separating/connecting device and the height of the device is also increased. In addition, if two types of cranes, i.e., cranes having the above-mentioned device and cranes free from the above-mentioned device, are manufactured, compatibility cannot be achieved between lower traveling bodies and upper rotating bodies of the two types of cranes. Accordingly, the development cost and the management cost are increased.

Japanese Unexamined Patent Application Publication No. 8-259178 discloses a known mobile crane having a releasable coupling that connects a lower carriage and an upper carriage to each other. An inner race of a swing bearing is fixed to the bottom surface of the upper carriage and an outer race (externally toothed ring) of the swing bearing is fitted around the inner race with rollers arranged in two vertically arranged rows interposed therebetween. The outer race has teeth that mesh with teeth of a pinion rotated by a swing motor along the periphery thereof and a cylindrical extending portion that projects downward from the bottom surface.

The outer race has claw-like ribs that project outward from the outer periphery of the outer race at the bottom end thereof. A holding ring having a ring extension that projects inward from the inner periphery thereof is fixed on the top surface of the lower carriage. The holding ring has claw-like ribs that project inward from the inner periphery of the holding ring at the top end thereof. The claw-like ribs of the holding ring engage with the claw-like ribs of the outer face, and accordingly the coupling establishes or releases connection by maintaining or canceling the engagement between the claw-like ribs.

However, according to this coupling, when, for example, a mobile crane is transported to a certain designation in a disassembled state or when the mobile crane is subjected to periodic inspection or maintenance in a maintenance facility of a dealer or a user, there is a risk that the claw-like ribs that engage with each other cause seizing in the operation of reassembling a lower traveling body and an upper rotating body of the mobile crane. In such a case, the lower traveling body and the upper rotating body cannot be completely separated from each other and the swing bearing must be replaced together with the holding ring. Therefore, assembling cost and maintenance cost of the mobile crane are increased.

SUMMARY OF THE INVENTION

Accordingly, an object of the present invention is to provide a construction machine having a small vertical separating/connecting device that eliminates the necessity of preparing a plurality of kinds of swing bearings and that can be replaced without replacing a swing bearing even when external teeth of an externally toothed inner ring and internal teeth of an internally toothed outer ring are damaged.

A construction machine according to the present invention has the following basic structure. That is, the construction machine includes a lower traveling body; an upper rotating body rotatably mounted on the lower traveling body; a swing bearing including an outer ring and an inner ring and supporting the upper rotating body such that the upper rotating body can rotate; and a vertical separating/connecting device interposed between the swing bearing and the lower traveling body and adapted to separate the lower traveling body and the upper rotating body from each other or to connect the lower traveling body and the upper rotating body to each other. The vertical separating/connecting device includes an externally toothed ring member fixed to a bottom surface of one of the outer ring and the inner ring of the swing bearing with a first ring-member-attaching unit and having lug-shaped external teeth that are arranged in the circumferential direction with predetermined intervals therebetween; a ring-member-rotating unit that rotates the externally toothed ring member in forward and reverse directions by a predetermined angle; an internally toothed ring member fixed to the lower traveling body with second ring-member-attaching means positioned on an attachment pitch circle having the same diameter and the same center as a pitch circle obtained by connecting attachment positions of the first ring-member-attaching means, the internally toothed ring member having internal teeth that mesh with the external teeth of the externally toothed ring member, the external teeth of the externally toothed ring member and the internal teeth of the internally toothed ring member being positioned such that the external teeth are allowed to move or such that the external teeth engage with the internal teeth when the externally toothed ring member is rotated by the ring-member-rotating unit by the predetermined angle; and a ring-member-fixing unit that fixes the externally toothed ring member or the internally toothed ring member to maintain the engagement between the external teeth and the internal teeth.

According to the present invention, the pitch circle obtained by connecting the attachment positions of the first ring-member-attaching unit that attaches the externally toothed ring member to the swing bearing and the pitch circle obtained by connecting the attachment positions of the second ring-member-attaching unit that attaches the internally toothed ring member to the lower traveling body have the same diameter and the same center. Therefore, the lower traveling body and the upper rotating body may be used irrespective of whether or not there is a necessity of separating the lower traveling body and the upper rotating body from each other.

Thus, according to the present invention, the compatibility between the lower traveling body and the upper rotating body can be maintained, and therefore the development cost of the construction machine is prevented from being increased. In addition, an unnecessary increase in height of the internally toothed outer ring is avoided. When the construction machine is transported to a certain designation in a disassembled state or when the construction machine is subjected to periodic maintenance in a maintenance facility of a dealer or a user, the external teeth of the externally toothed ring member and the internal teeth of the internally toothed ring member of the vertical separating/connecting device may be damaged in the operation of reassembling the lower traveling body and the upper rotating body. Even in such a case, the externally toothed ring member and the internally toothed ring member can be replaced independently of the swing bearing. Since it is not necessary to replace the swing bearing, cost of reassembling after transportation and maintenance cost of the construction machine can be prevented from being increased.

DESCRIPTION OF THE PREFERRED EMBODIMENTS

A vertical separating/connecting device included in a construction machine according to an embodiment of the present invention will be described below with reference to the accompanying drawings. In this embodiment, a mobile crane is described as an example of a construction machine.

Figure 1:
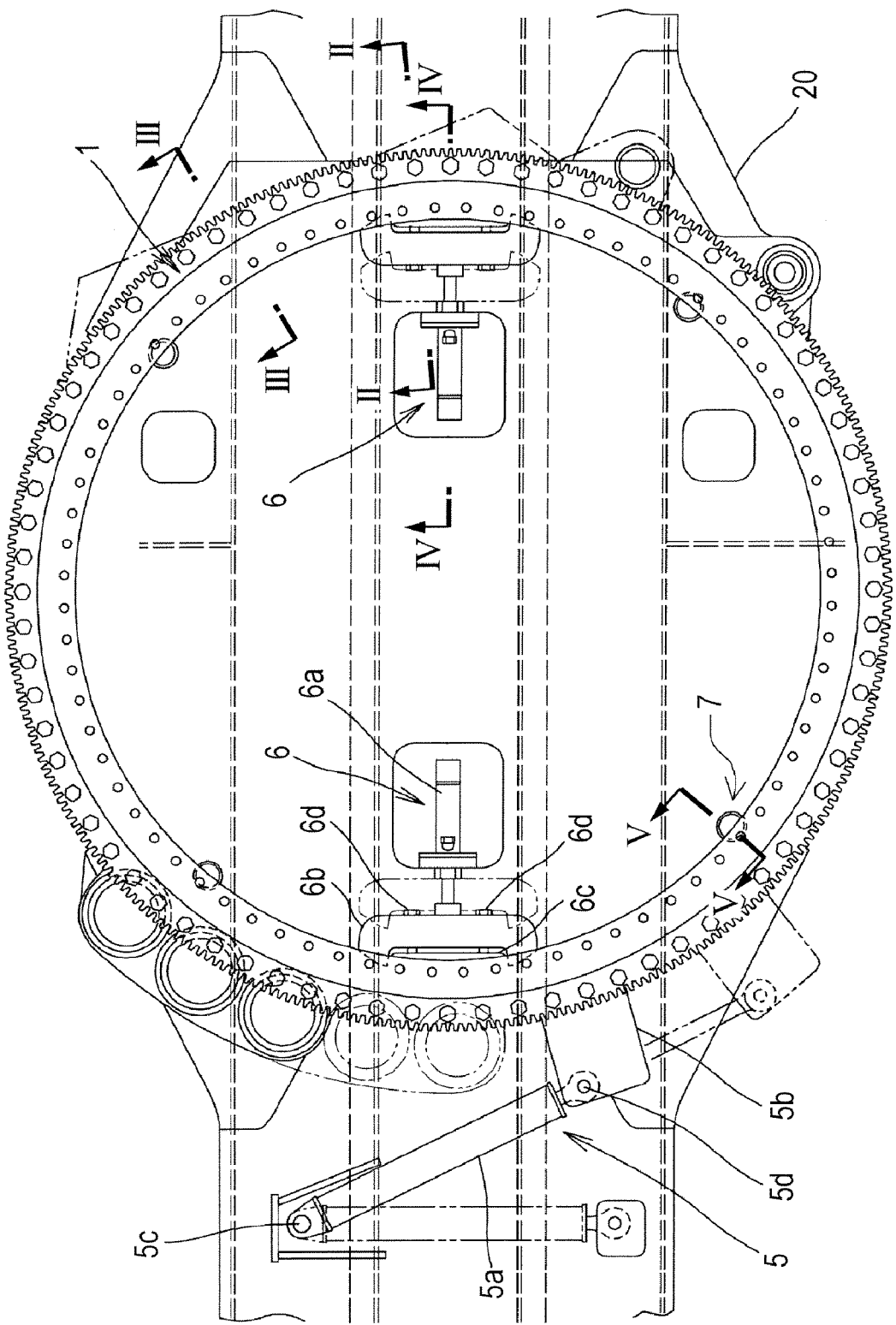
FIG. 1 is a plan view of a swing bearing and a vertical separating/connecting device included in a mobile crane according to an embodiment of the present invention.
Figure 2:
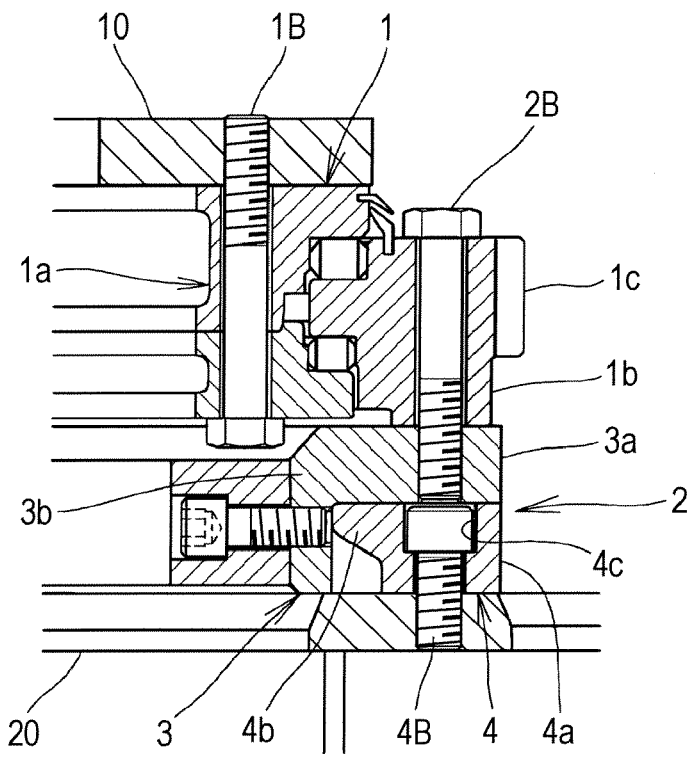
FIG. 2 is a sectional view of FIG. 1 taken along line II-II.
Figure 3:
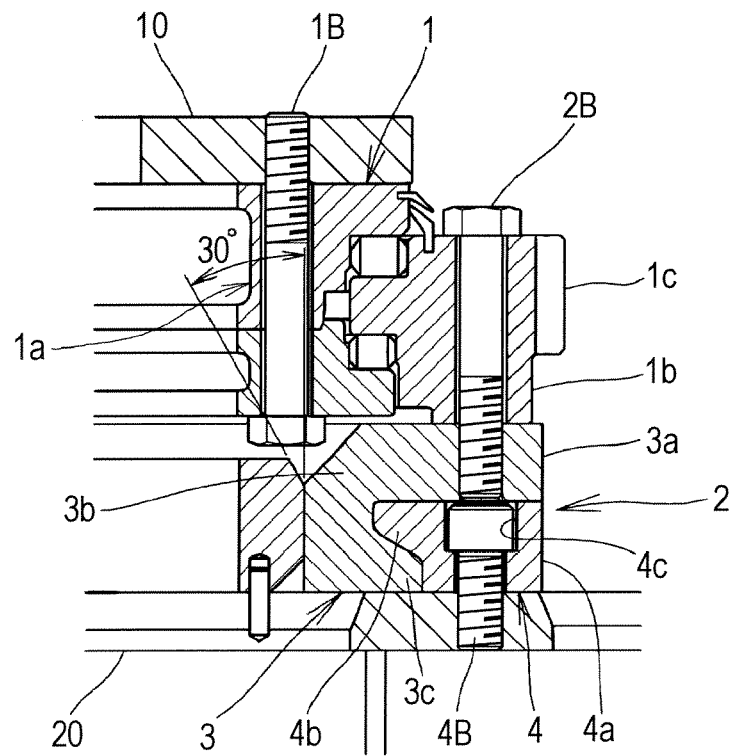
FIG. 3 is a sectional view of FIG. 1 taken along line III-III.
Figure 4:
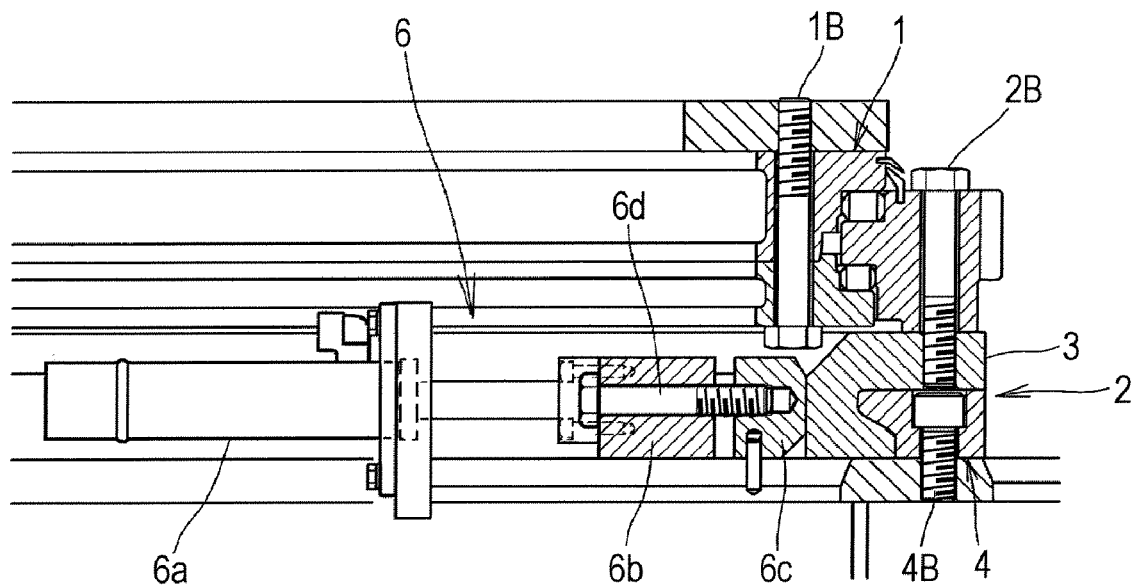
FIG. 4 is a sectional view of FIG. 1 taken along line IV-IV.
Figure 5:
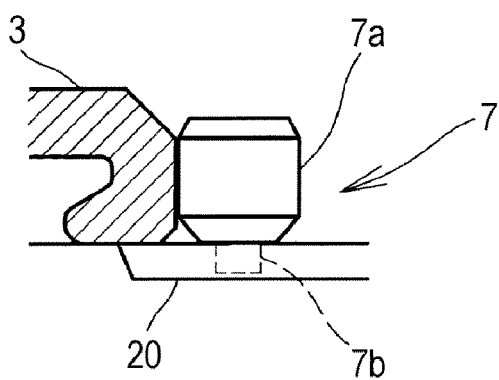
FIG. 5 is a sectional view of FIG. 1 taken along line V-V.
Figure 6:
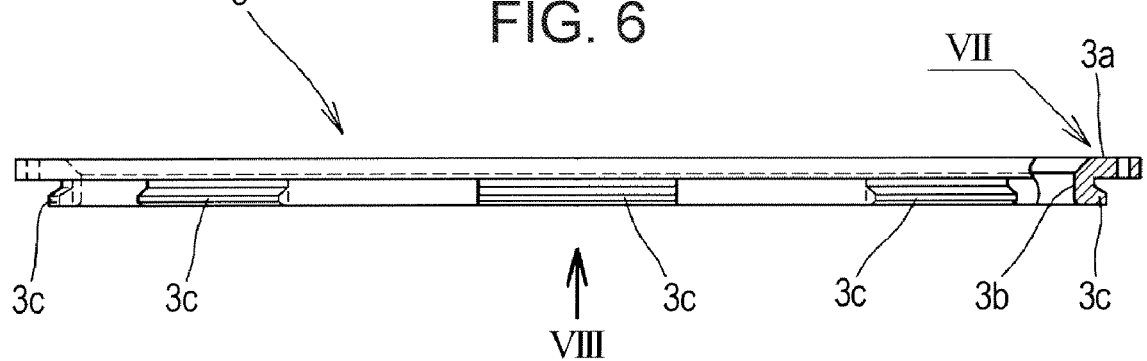
FIG. 6 is a partially sectioned side view of an externally toothed inner ring member included in the vertical separating/connecting device of the mobile crane according to the embodiment of the present invention.
Figure 7:
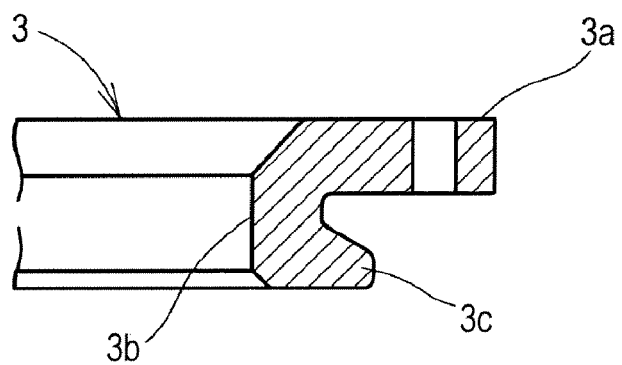
FIG. 7 is an enlarged view of part VII shown in FIG. 6.
Figure 8:
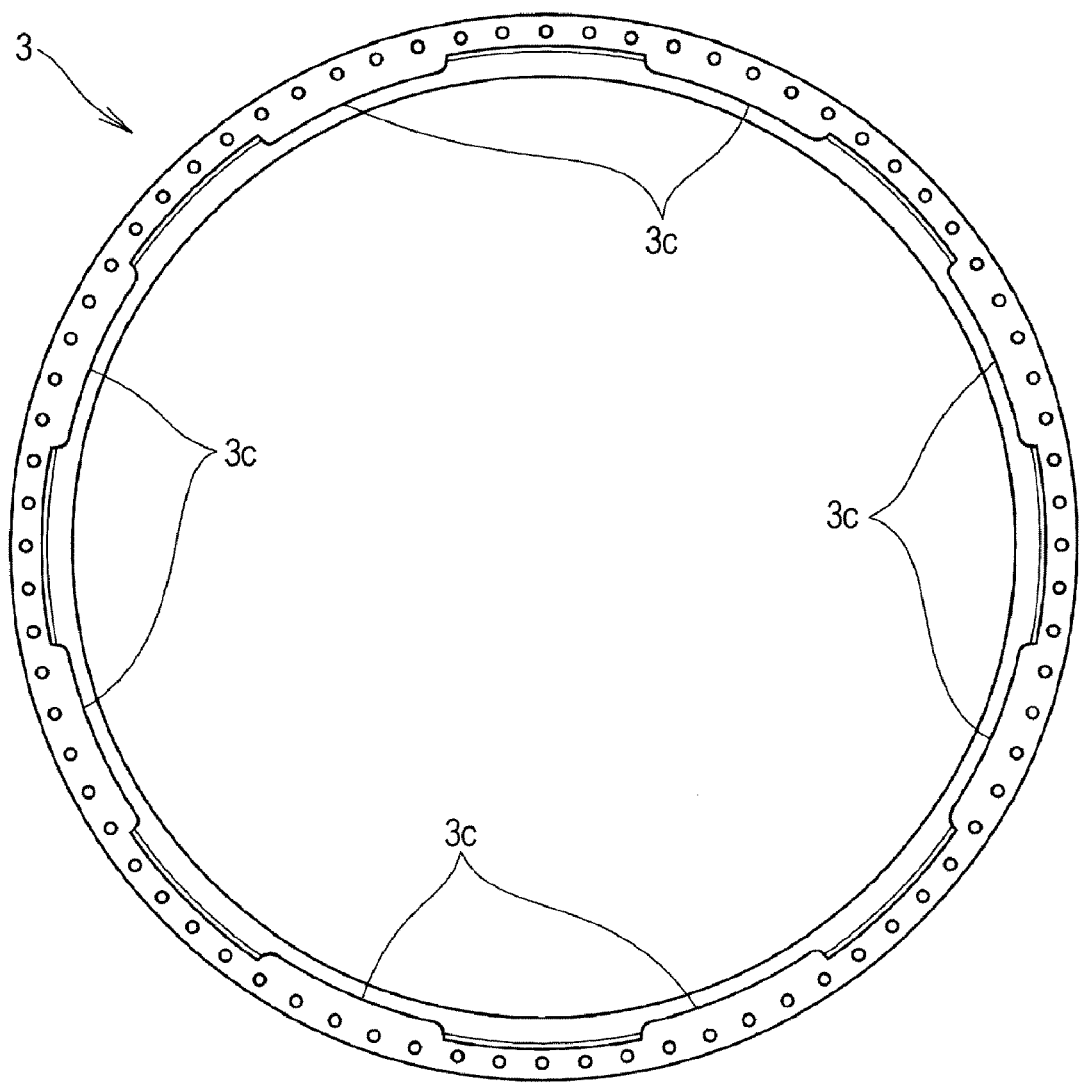
FIG. 8 is a view on arrow VIII shown in FIG. 6.
Figure 9:
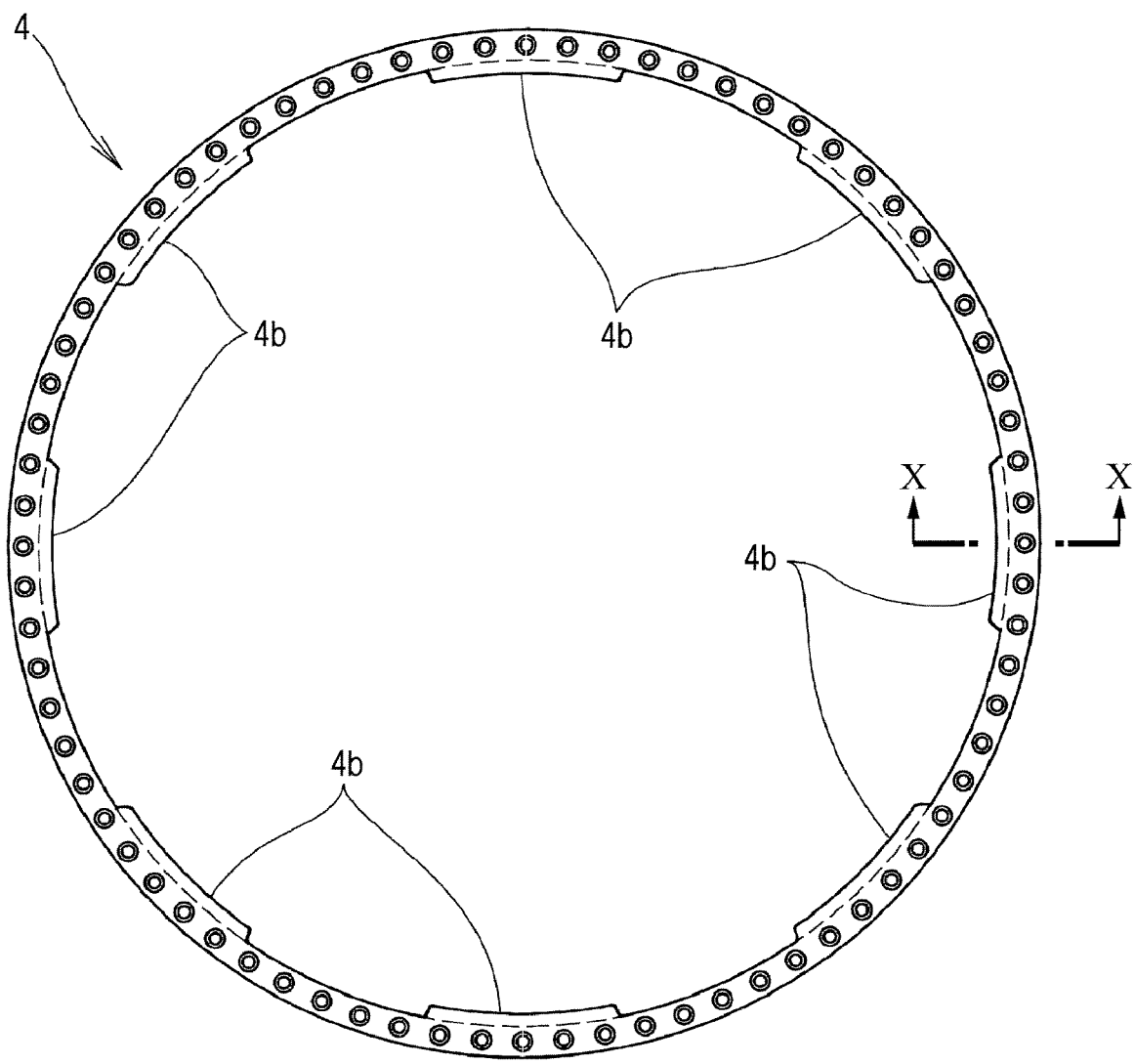
FIG. 9 is a plan view of an internally toothed outer ring member included in the vertical separating/connecting device of the mobile crane according to the embodiment of the present invention.
Figure 10:
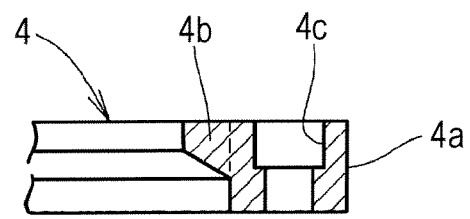
FIG. 10 is a sectional view of FIG. 9 taken along line X-X.

FIG. 1 is a plan view of a swing bearing and a vertical separating/connecting device included in a mobile crane. FIG. 2 is a sectional view of FIG. 1 taken along line II-II, FIG. 3 is a sectional view of FIG. 1 taken along line III-III, FIG. 4 is a sectional view of FIG. 1 taken along line IV-IV, and FIG. 5 is a sectional view of FIG. 1 taken along line V-V. FIG. 6 is a partially sectioned side view of an externally toothed inner ring member, FIG. 7 is an enlarged view of part VII shown in FIG. 6, and FIG. 8 is a view on arrow VIII shown in FIG. 6. FIG. 9 is a plan view of an internally toothed outer ring member and FIG. 10 is a sectional view of FIG. 9 taken along line X-X.

Referring to the figures, a swing bearing 1 is fixed to the bottom surface of an upper rotating body 10 with bearing-attaching bolts (bearing-attaching means) 1B. More specifically, the swing bearing 1 is fixed to the bottom surface of the upper rotating body 10 by inserting the bearing-attaching bolts 1B into vertical bolt holes, and includes an inner ring (inner race) 1a formed by placing an upper race on top of a lower race. An outer ring (outer race) 1b is fitted around the inner race 1a with rollers arranged in two vertically arranged rows interposed therebetween. The outer ring 1b has teeth 1c that mesh with teeth of a pinion rotated by an output shaft of a swing motor (not shown) along the outer periphery thereof.

A vertical separating/connecting device 2, which will be described below, is disposed between the bottom surface of the swing bearing 1 having the above-described structured and the top surface of a lower traveling body 20. The vertical separating/connecting device 2 serves to separate the upper rotating body 10 from the lower traveling body 20 or connect the upper rotating body 10 to the lower traveling body 20. In the present embodiment, the bearing-attaching bolts 1B are described as an example of bearing-attaching means. However, the bearing-attaching means is not limited to this, and other kinds of attaching means may also be used.

The vertical separating/connecting device 2 includes an externally toothed ring member (hereafter simply called an externally toothed inner ring) 3 that is structured as described below. The externally toothed inner ring 3 is fixed to the bottom surface of the outer race 1b of the swing bearing 1 with inner-ring-attaching bolts (first ring-member-attaching means) 2B that extend through vertical bolt holes formed in the outer race 1b. The externally toothed inner ring 3 includes a flange portion 3a that is fixed to the bottom surface of the outer race 1b and a cylindrical portion 3b that is integrated with the flange portion 3a and that projects downward from the flange portion 3a. The bottom end surface of the cylindrical portion 3b is in contact with the top surface of a carrier frame of the lower traveling body 20. The cylindrical portion 3b has a plurality of lug-shaped (hereafter sometimes called lug-flange-shaped) external teeth 3c that project outward from the outer periphery of the cylindrical portion 3b at the bottom end thereof, the external teeth 3c being arranged in the circumferential direction of the cylindrical portion 3b with intervals therebetween. The top surface of each external tooth 3c is formed as an inclined tooth surface whose height is reduced toward the outside, so that the thickness of the external tooth 3c at the proximal end is larger than that at the distal end.

In addition, the vertical separating/connecting device 2 also includes an internally toothed ring member (hereafter simply called an internally toothed outer ring) 4 that is structured as described below. The internally toothed outer ring 4 is fixed to the top surface of the carrier frame of the lower traveling body 20 with outer-ring-attaching bolts (second ring-member-attaching means) 4B that are inserted into bolt holes arranged along a bolt pitch circle having the same diameter and the same center as a bolt pitch circle of the inner-ring-attaching bolts 2B. The internally toothed outer ring 4 has a cylindrical portion 4a, and the top surface of the cylindrical portion 4a is in contact with the bottom surface of the flange portion 3a of the externally toothed inner ring 3. The cylindrical portion 4a has a plurality of lug-flange-shaped, internal teeth 4b that project inward from the inner periphery of the cylindrical portion 4a at the top end thereof, the internal teeth 4b being arranged with intervals large enough to allow the external teeth 3c of the externally toothed inner ring 3 to pass therethrough. The bottom surface of each internal tooth 4b is formed as an inclined tooth surface whose height is increased toward the outside, so that the thickness of the internal tooth 4b at the proximal end is larger than that at the distal end. The bottom surfaces, that is, the inclined tooth surfaces, of the internal teeth 4b are in contact with the top surfaces, that is, the inclines tooth surfaces, of the external teeth 3c of the externally toothed inner ring 3 (see FIG. 3).

In addition, the vertical separating/connecting device 2 includes an inner-ring-rotating unit (ring-member-rotating unit) 5. The inner-ring-rotating unit 5 can rotate the externally toothed inner ring 3 around the radial center thereof in forward and reverse directions by a predetermined angle. The inner-ring-rotating unit 5 includes a rotating hydraulic cylinder 5a that is connected to a bracket provided on the carrier frame of the lower traveling body 20 with a cylinder connecting pin 5c at a bottom end thereof. The rotating hydraulic cylinder 5a has an extendable rod that is connected to an inner-ring-rotating lever 5b that projects from the outer periphery of the externally toothed inner ring 3 with a removable rod-connecting pin 5d at a distal end thereof.

In the inner-ring-rotating unit S, when the externally toothed inner ring 3 must be rotated to attach the upper rotating body 10 to the lower traveling body 20 or remove the upper rotating body 10 from the lower traveling body 20, the distal end of the extendable rod of the rotating hydraulic cylinder 5a is connected to the inner-ring-rotating lever 5b with the rod-connecting pin 5d. When the upper rotating body 10 is connected to or separated from the lower traveling body 20 and it is not necessary to rotate the externally toothed inner ring 3, the rod-connecting pin 5d is pulled out so as to cancel the connection between the distal end of the extendable rod and the inner-ring-rotating lever 5b.

The vertical separating/connecting device 2 includes inner-ring-fixing units (ring-member-fixing units) 6 that fix the externally toothed inner ring 3 at a position where the external teeth 3c completely mesh with the internal teeth 4b of the internally toothed outer ring 4 after the externally toothed inner ring 3 is rotated to the position where the external teeth 3c mesh with the internal teeth 4b by the inner-ring-rotating unit 5. The inner-ring-fixing units 6 are located inside the externally toothed inner ring 3 at two positions near the front and back ends in the moving direction of the lower traveling body 20.

The inner-ring-fixing units 6 may also be located inside the externally toothed inner ring 3 at two positions adjacent to the left and right sides of the lower traveling body 20. Thus, the number and positions of the inner-ring-fixing units 6 are not limited.

Each of the inner-ring-fixing units 6 includes a fixing hydraulic cylinder 6a, which will be described below. A head end of the fixing hydraulic cylinder 6a is attached to a bracket provided on the carrier frame of the lower traveling body 20 with attachment bolts. The fixing hydraulic cylinder 6a has an extendable rod that projects from a hole formed in the bracket, and a fork-shaped fixing part 6b is fixed to the extendable rod at the distal end thereof. In addition, retaining parts 6c are fixed on the inner peripheral surface of the externally toothed inner ring 3. The externally toothed inner ring 3 is fixed when the ends of each retaining part 6c in the circumferential direction of the externally toothed inner ring 3 are pressed by the corresponding fork-shaped fixing part 6b. In the state in which the ends of each retaining part 6c in the circumferential direction of the externally toothed inner ring 3 are pressed by the corresponding fixing part 6b, the fixing part 6b and the retaining part 6c are fastened to each other by attachment bolts 6d. Accordingly, the externally toothed inner ring 3 is continuously fixed even when an engine of the mobile crane is not operated and oil pressure is not supplied to the fixing hydraulic cylinder 6a.

The vertical separating/connecting device 2 also includes four inner-ring guides 7 placed at four positions inside the externally toothed inner ring 3 so as to guide the externally toothed inner ring 3 such that the externally toothed inner ring 3 is rotated by the inner-ring-rotating unit 5 at a predetermined position. As shown in FIG. 5, each inner-ring guide 7 includes a rod-shaped guiding portion 7a and a small-diameter fitting projection 7b that projects from the bottom surface of the guiding portion 7a. The fitting projection 7b is fitted to a guide-fitting hole formed in the carrier frame of the lower traveling body 20, and accordingly the ring guide 7 is attached to the lower traveling body 20. Although four inner-ring guides 7 are provided at four positions inside the externally toothed inner ring 3, the number of inner-ring guides 7 is not particularly limited and five or more inner-ring guides 7 may also be provided at five or more positions.

Next, separating/connecting processes performed using the vertical separating/connecting device 2 included in the mobile crane according to the present embodiment will be described below.

A process of connecting the upper rotating body 10 to the lower traveling body 20 will be described below. First, the upper rotating body 10 is lifted and moved downward while the external teeth 3c of the externally toothed inner ring 3 fixed to the swing bearing 1 are positioned between the internal teeth 4b of the internally toothed outer ring 4. Accordingly, the bottom surface of the flange portion 3a of the externally toothed inner ring 3 comes into contact with the top surface of the cylindrical portion 4a of the internally toothed outer ring 4.

Next, the distal end of the extendable rod of the rotating hydraulic cylinder 5a is connected to the inner-ring-rotating lever 5b with the rod-connecting pin 5d. Then, the extendable rod of the rotating hydraulic cylinder 5a is extended so that the externally toothed inner ring 3 rotates in a direction to engage the external teeth 3c thereof with the internal teeth 4b of the internally toothed outer ring 4. Accordingly, the upper rotating body 10 is connected to the lower traveling body 20.

Next, a process of removing the upper rotating body 10 from the lower traveling body 20 will be described below. First, the extendable rod of the rotating hydraulic cylinder 5a is extended and is connected to the inner-ring-rotating lever 5b with the rod-connecting pin 5d. Then, the extendable rod of the rotating hydraulic cylinder 5a is contracted so that the externally toothed inner ring 3 rotates in a direction to release the external teeth 3c thereof from the internal teeth 4b of the internally toothed outer ring 4. Thus, the engagement between the external teeth 3c of the externally toothed inner ring 3 and the internal teeth 4b of the internally toothed outer ring 4 is canceled. Then, the upper rotating body 10 is lifted by a crane or the like and is moved away from the lower traveling body 20.

The upper rotating body 10 is separated from or connected to the lower traveling body 20 by the above-described processes. In the above-described vertical separating/connecting device 2, the bolt pitch circle of the inner-ring-attaching bolts 2B for attaching the externally toothed inner ring 3 to the swing bearing 1 and the bolt pitch circle of the outer-ring-attaching bolts 4B for attaching the internally toothed outer ring 4 to the lower traveling body 20 have the same diameter and the same center. Therefore, the lower traveling body 20 and the upper rotating body 10 may be used irrespective of whether or not they is a necessity of separating the lower traveling body 20 and the upper rotating body 10 from each other.

In the construction machine having the above-described vertical separating/connecting device 2, it is not necessary to manufacture a dedicated lower traveling body since the vertical separating/connecting device 2 can be simply added. Accordingly, the compatibility between the lower traveling body 20 and the upper rotating body 10 can be maintained. Therefore, the development cost of the mobile crane is prevented from being increased. In addition, an unnecessary increase in height of the internally toothed outer ring 4 is avoided. When the mobile crane is transported to a certain designation in a state in which the upper rotating body 10 is removed or when the mobile crane is subjected to periodic maintenance in a maintenance facility of a dealer or a user, seizing of the external teeth 3c of the externally toothed ring member 3 and the internal teeth 4b of the internally toothed ring member 4 may occur in the vertical separating/connecting device 2 in the operation of reassembling the lower traveling body 20 and the upper rotating body 10. Even in such a case, the vertical separating/connecting device 2 can be replaced independently of the swing bearing 1. Since it is not necessary to replace the swing bearing 1 together with the vertical separating/connecting device 2, cost of reassembling after transportation and maintenance cost of the mobile crane can be prevented from being increased.

In the vertical separating/connecting device 2, the weight of the upper rotating body 10 and load placed on the upper rotating body 10 are transmitted to the top surface of the internally toothed outer ring 4 via the externally toothed inner ring 3 placed directly under the swing bearing 1. Thus, the vertical separating/connecting device 2 is advantageous in view of the strength thereof, and therefore the weight of the vertical separating/connecting device 2 can be reduced. As a result, the overall weight of the mobile crane can be reduced.

In addition, in the vertical separating/connecting device 2 according to the present invention, the internally toothed outer ring 4 has counter bores (spot facing) 4c for receiving the heads of the outer-ring-attaching bolts 4B in the top surface thereof. Accordingly, the heads of the outer-ring-attaching bolts 4B do not project from the top surface of the internally toothed outer ring 4. Therefore, it is not necessary to form holes for receiving the heads of the outer-ring-attaching bolts 4B in the externally toothed inner ring 3, and accordingly a large contact area is provided. Thus, according to the present invention, the strength of the vertical separating/connecting device 2 can be increased and the weight thereof can be reduced.

In the vertical separating/connecting device 2, each of the external teeth 3c of the externally toothed inner ring 3 and the internal teeth 4b of the internally toothed outer ring 4 that mesh with each other has a tooth surface that is inclined such that the tooth thickness at the proximal end is larger than that at the distal end. Therefore, according to the present invention, the overall height of the vertical separating/connecting device 2 can be reduced while ensuring the thicknesses of the external teeth 3c of the externally toothed inner ring 3 and the internal teeth 4b of the internally toothed outer ring 4 at the proximal ends thereof. Accordingly, in addition to an advantage that the weight of the vertical separating/connecting device 2 can be reduced, an advantage that the load-hoisting performance (self loading) is prevented from being reduced can be obtained.

Although the external teeth 3c are provided on the inner ring (externally toothed inner ring 3) and the internal teeth 4b are provided on the outer ring (internally toothed outer ring 4) in the present embodiment, the structure may also be reversed. More specifically, the internal teeth 4b and the external teeth 3c shown in FIGS. 8 and 9 may also be provided on the inner ring and the outer ring, respectively. In addition, the vertical positions of the internal teeth 4b and the external teeth 3c may also be inverted.

In the above-described embodiment, the vertical separating/connecting device is used in a mobile crane. However, the present invention is not limited to this. For example, the vertical separating/connecting device may also be used for separating and connecting a lower traveling body and an upper rotating body of a crawler crane, a large hydraulic excavator, etc.

In addition, in the above-described embodiment, the inner race 1a of the swing bearing 1 is fixed to the upper rotating body 10 and the externally toothed inner ring 3 of the vertical separating/connecting device 2 is fixed to the bottom surface of the outer race 1b. In addition, the outer race 1b has the teeth 1c that mesh with teeth of a pinion rotated by an output shaft of a swing motor (not shown) along the outer periphery thereof. However, the present invention is not limited to the structure of the vertical separating/connecting device 2 according to the above-described embodiment.

For example, an outer race of a swing bearing may be fixed to the upper rotating body 10 and the externally toothed inner ring 3 of the vertical separating/connecting device 2 may be fixed to the bottom surface of an inner race having an internal gear that includes teeth that mesh with teeth of a pinion rotated by an output shaft of a swing motor. Also in this case, effects similar to those obtained by the vertical separating/connecting device 2 according to the above-described embodiment can be obtained.

Although the invention has been described with reference to the preferred embodiments in the attached figures, it is noted that equivalents may be employed and substitutions made herein without departing from the scope of the invention as recited in the claims.

What is claimed is:

1. A construction machine comprising:
a lower traveling body;
an upper rotating body rotatably mounted on the lower traveling body;
a swing bearing including an outer ring and an inner ring and supporting the upper rotating body such that the upper rotating body can rotate; and
a vertical separating/connecting device interposed between the swing bearing and the lower traveling body and adapted to separate the lower traveling body and the upper rotating body from each other or to connect the lower traveling body and the upper rotating body to each other, the vertical separating/connecting device including:
an externally toothed ring member fixed to a bottom surface of one of the outer ring and the inner ring of the swing bearing with first ring-member-attaching means and having lug-shaped external teeth that are arranged in the circumferential direction with predetermined intervals therebetween;
a ring-member-rotating unit that rotates the externally toothed ring member in forward and reverse directions by a predetermined angle;
an internally toothed ring member fixed to the lower traveling body with second ring-member-attaching means positioned on an attachment pitch circle having the same diameter and the same center as a pitch circle obtained by connecting attachment positions of the first ring-member-attaching means, the internally toothed ring member having internal teeth that mesh with the external teeth of the externally toothed ring member, the external teeth of the externally toothed ring member and the internal teeth of the internally toothed ring member being positioned such that the external teeth are allowed to move or such that the external teeth engage with the internal teeth when the externally toothed ring member is rotated by the ring-member-rotating unit by the predetermined angle; and
a ring-member-fixing unit that fixes the externally toothed ring member or the internally toothed ring member to maintain the engagement between the external teeth and the internal teeth.

2. A construction machine comprising:
a lower traveling body;
an upper rotating body rotatably mounted on the lower traveling body;

a swing bearing including an outer race and an inner race and supporting the upper rotating body such that the upper rotating body can rotate; and a vertical separating/connecting device interposed between the swing bearing and the lower traveling body and adapted to separate the lower traveling body and the upper rotating body from each other or to connect the lower traveling body and the upper rotating body to each other, the vertical separating/connecting device including:

an externally toothed inner ring fixed to a bottom surface of one of the outer race and the inner race of the swing bearing with inner-ring-attaching bolts and having lug-flange-shaped external teeth that are arranged in the circumferential direction with predetermined intervals therebetween;

an inner-ring-rotating unit that rotates the externally toothed inner ring in forward and reverse directions by a predetermined angle;

an internally toothed outer ring fixed to the lower traveling body with outer-ring-attaching bolts positioned on a bolt pitch circle having the same diameter and the same center as a bolt pitch circle of the inner-ring-attaching bolts, the internally toothed outer ring having lug-flange-shaped internal teeth that are arranged in the circumferential direction with intervals large enough to allow the external teeth of the externally toothed inner ring to pass therethrough and that have bottom surfaces that engage with top surfaces of the external teeth when the externally toothed inner ring is rotated by the inner-ring-rotating unit by the predetermined angle; and an inner-ring-fixing unit that fixes the externally toothed inner ring to maintain the engagement between the external teeth and the internal teeth.

3. The construction machine according to claim 2, wherein the weight of the upper rotating body and load placed on the upper rotating body are applied to the top surface of the internally toothed outer ring from the bottom surface of the externally toothed inner ring.

4. The construction machine according to claim 3, wherein the internally toothed outer ring has holes in the top surface thereof, the holes being deep enough to receive bolt heads of the outer-ring-attaching bolts without causing the bolt heads to project from the top surface of the internally toothed outer ring.

5. The construction machine according to claim 3, wherein each of the external teeth of the externally toothed inner ring and the internal teeth of the internally toothed outer ring that mesh with the external teeth has a tooth surface that is inclined such that the tooth thickness at the proximal end is larger than the tooth thickness at the distal end.

6. The construction machine according to claim 2, wherein the internally toothed outer ring has holes in the top surface thereof, the holes being deep enough to receive bolt heads of the outer-ring-attaching bolts without causing the bolt heads to project from the top surface of the internally toothed outer ring.

7. The construction machine according to claim 6, wherein each of the external teeth of the externally toothed inner ring and the internal teeth of the internally toothed outer ring that mesh with the external teeth has a tooth surface that is inclined such that the tooth thickness at the proximal end is larger than the tooth thickness at the distal end.

8. The construction machine according to claim 2, wherein each of the external teeth of the externally toothed inner ring and the internal teeth of the internally toothed outer ring that mesh with the external teeth has a tooth surface that is inclined such that the tooth thickness at the proximal end is larger than the tooth thickness at the distal end.

* * * * *